Oct. 1, 1935.  J. CLAUSEN  2,016,228
TANK CONSTRUCTION
Filed Feb. 25, 1933
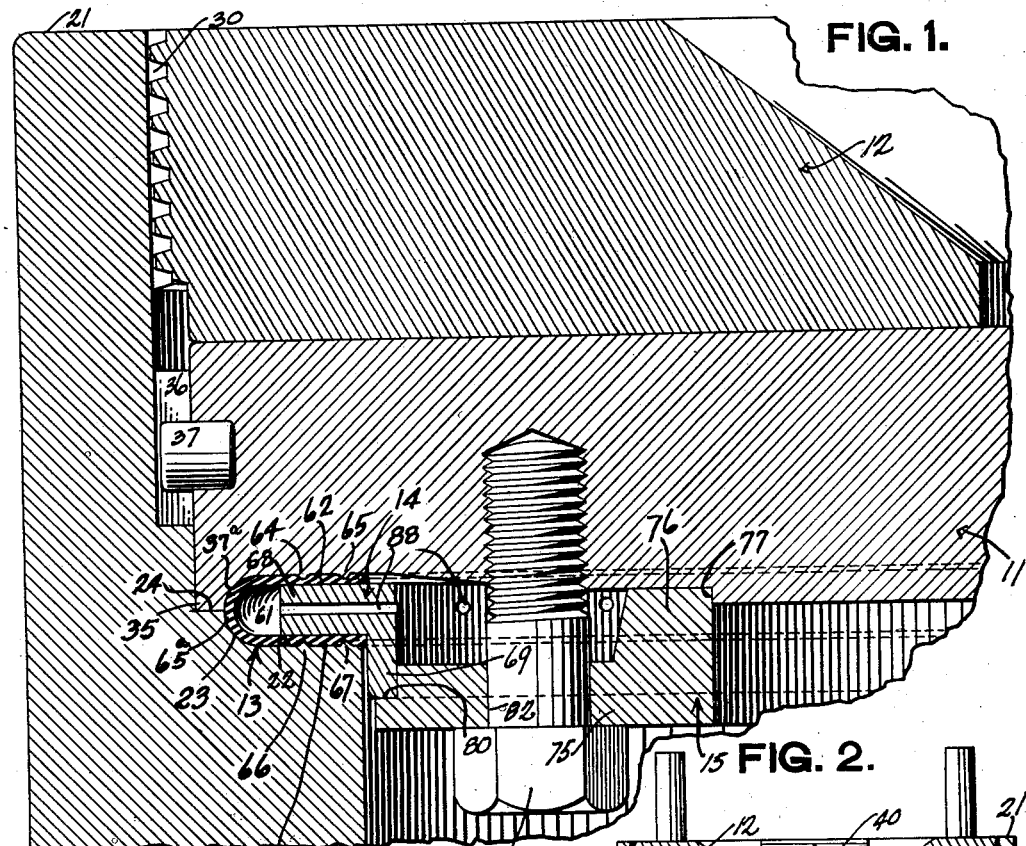
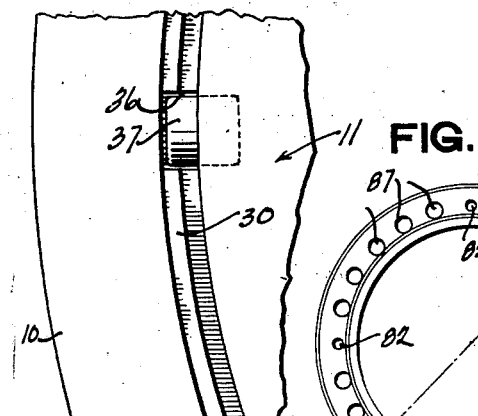
INVENTOR.
Jens Clausen
BY
Lancaster, Allwine and Rommel
ATTORNEYS.

Patented Oct. 1, 1935

2,016,228

UNITED STATES PATENT OFFICE 2,016,228

TANK CONSTRUCTION

Jens Clausen, Harrisburg, Pa., assignor to Harrisburg Steel Corporation, a corporation of Pennsylvania Application February 25, 1933, Serial No. 658,611

13 Claims. (Cl. 220—46)

This invention relates to improvements in liquefier tanks or containers adapted to receive gas or other fluids under high pressure.

The primary object of the invention is the provision of improved means for sealing the closures of liquefier tanks, such as are adapted to receive carbon dioxide and the like, and wherein the internal pressure is considerably above atmospheric; the improved means insuring that the closure plate may be properly centered in the tank during placement, independent of the position of the tank, whether vertical, horizontal or inclined, without eccentrically squeezing the gasket.

Other objects and advantages of this invention will be apparent during the course of the following detailed description.

In the accompanying drawing, forming a part of this specification, and wherein similar reference characters designate corresponding parts throughout the several views, Figure 1 is a fragmentary sectional view of an upper portion of the high pressure tank or container, showing more particularly the improved gasket clamping structure in association with the tank body and closure.

Figure 2 is a fragmentary side elevation, partly in section, of a liquefier or high gas pressure tank or container of the type now coming into general use for receiving phase changeable material, such as solid carbon dioxide, in connection with which my invention is most adaptable.

Figure 3 is a top plan view of an improved gasket clamping ring associated with the closure of the tank.

Figure 4 is a sectional view taken substantially on the line 4—4 of Figure 3.

Figure 5 is an enlarged fragmentary view showing means to insure the proper placement of the closure plate in the tank body, so that there will be no circumferential movement of the closure plate during the clamping of the same in position, and thus eliminating the possibility of injury to the gasket structure.

In the drawing, wherein for the purpose of illustration is shown only a preferred embodiment of the invention, the liquefier tank structure A includes a cylinder shell or tank body 10, a closure plate 11, a closure clamping and retaining ring or member 12, a gasket 13, a gasket separating and shaping ring or member 14, and a gasket clamping ring or member 15.

The tank body, closure plate, clamping member, gasket separating ring and gasket clamping member, are all preferably of forged metal.

The cylinder shell 10 is preferably a seamless forging with a dome-shaped bottom 15 having a drain nipple 16 at its lower end wherein a plug or drain valve may be positioned. This shell forging may be manufactured after the cylinder method set forth in U. S. Patent #1,948,437, and the tank is provided with a suitable relief valve and a suitable valve to control the exit of gases from the tank, in accordance with the principle enumerated in my co-pending application Serial No. 589,273, filed January 27, 1932.

The cylinder shell 10 at its upper end is preferably provided with an annular inwardly extending flange 20 below the top edge 21 thereof, to provide a gasket seating shoulder 22 facing the opening in the shell. This shoulder may have a concavely surfaced fillet 23 where it merges into the annular closure plate seat or shelf 24. This shelf 24 is in a plane at right angles to the axis of the tank body and also faces the opening of the shell. It receives the closure plate 11 in resting engagement thereon. The opening in the shell below the top edge 21 and above the shoulder 24 is internally screw threaded at 30 to interengage with the threads upon the outer periphery of the clamping ring or member 12. The screw threads 30 terminate in spaced relation above the shoulder 24 for a considerable distance, and in this space below the screw threads 30 the closure plate 11 is adapted to seat.

The closure plate 11 is preferably a flat forging which at its outer margin has a depending skirt flange 35 adapted to seat on the shoulder 24. This flange at its outer edge is of the same width as the shoulder or seat 24 and has a concavely surfaced fillet 37ᵃ merging into the lower surface of the plate adjacent to the skirt. This plate is provided with a handle 40. When in position the plate 11 at the inner or bottom surface thereof is spaced from the gasket seating shoulder 22 to provide an annular groove wherein the gasket 13 is received and compressed in sealing engagement across the juncture of the closure plate with its seat in the shell body.

The clamping member 12 is preferably screw threaded at its periphery for engagement with the screw threads 30 in the mouth of the shell 10 so that the same may clamp against the closure plate 11 as shown in Figures 1 and 2 of the drawing. The cover construction may be of one piece, although the provision of the closure plate 11 and separate clamping ring 12 is desirable, since thereby the closure plate may be lowered into seating engagement against the gasket and clamped tight thereon by the clamping ring 12 without rotating the closure plate 11. The screw threaded connection of the clamping ring or member 12 with the shell 10 may be of the continuous thread construction or panels of interrupted screw threads may be provided upon these parts as set forth in my co-pending application Serial No. 589,273.

To prevent rotation of the closure plate 11 during rotation of the ring 12 to clamp the plate upon the gasket, I provide a slot 36 opening laterally into the tank shell and into the mouth end of the said shell wherein is adapted to be received a radially extending lug 37 provided on the outer periphery of the closure plate 11. It is readily apparent that the plate 11 must always be lowered so that this lug enters the slot 36, thus definitely positioning the same against rotation.

Referring to the gasket construction, the same includes the yieldable and distensible gasket member 13, of soft rubber, leather, or other composition material, which is ring-shaped, and in cross section channel-shaped, being provided with a channel facing the axis of the ring, designated at 61. The upper and lower flanges 62 and 63 thereof are adapted to engage respectively the lower surface of the closure plate 11 and the shelf 22 of the tank shell 10, and the arcuate bight portions 65a thereof engages the contiguous walls formed by the fillets 23 and 37 across the juncture of the closure plate with the seat 24 of the shell 10. The lower surface of the closure plate 11 where it is adapted to contact with the flange 62 of the gasket is provided with annular concentric ribs 64 and 65, and correspondingly the shelf or seat 22 is provided with concentric ribs 66 and 67. These ribs 64 to 67 are each continuous and unbroken and they are adapted to compress the material of the gasket to increase the sealing efficiency thereof.

A preferably metal rigid shaping ring 14 is provided as part of the gasket construction, which includes a ring-shaped body portion 68 of any approved construction, although preferably having the upper and lower surfaces thereof parallel. This ring 68 at the inner margin thereof is provided with a centering skirt or extension 69 projecting at right angles to the plane of the ring. The body portion 68 of this shaping ring of course extends into the channel way 61 of the gasket proper, so as to permit the clamping of the upper and lower flanges of the gasket thereagainst and between the closure plate 11 and the seat 22 of the tank body 10. The centering skirt or extension 69 is of such size that the same will just fit into the tank body 10 inwardly or below the seat 22. Since the gasket retaining member 15 is clamped into position to hold the shaping ring 14 in predetermined centered loctation with respect to the closure plate 11 it can readily be understood that the annuar lip or skirt 69 of the shaping ring will properly center the closure plate 11 and its gasket structure in the tank body 10 as the skirt 69 is lowered into the tank 10 inwardly of the seat 22. If desired, the lower outside peripheral corner of the skirt 69 may be convexly rounded to assist the centering of the closure plate.

The gasket structure retaining member 15 is of ring-shaped formation. It includes the disc-shaped body 75 which at the inner peripheral margin thereof is provided with a seating extension 76 adapted to engage in seating relation with the annular shoulder 77 provided on the inner or bottom surface of the closure plate 11 to axially center the retaining ring 15 with the closure plate, and to space the body portion 75 from the under surface of the closure plate. The outer marginal corner of the body 75 of this clamping ring 15 is removed as shown at 80, to provide a seat for the inner corner portion of the skirt 69 of the shaping ring. The body 75 is provided with a plurality of bolt receiving openings 82 therein through which clamping bolts 83, shown in Figure 1, extend in order to clamp the retaining ring or member 15 upon the inner surface of the closure plate 11 and to clamp the shaping ring in centered relation upon the inner surface of the closure plate 11. This holds the gasket proper 13 in position so that upon placement of the closure plate 11 in the mouth of the tank body, the entrance of the skirt 69 into the said tank body past the gasket seat 22 will insure the centering of the closure 11 in the tank body and the proper seating of the gasket proper upon the seat 22.

The body 75 of the clamping ring 15 is provided with a plurality of openings or ports 87 which open into the space between the bottom of the closure plate and the body 75, radially beyond the extension 76 for the admission of gases from the tank, so that they may pass therefrom through ducts 88 provided through the shaping ring and enter the channel groove of the distensible gasket for inflating the same into sealing engagement across the juncture of the closure plate and tank body.

Liquefier tanks are used not only in vertical position but also horizontal or inclined positions, and therefore the proper centering and positioning of the gasket structure on the inner surface of the closure plate is important. It is particularly important where the tank is horizontally positioned to insure that the closure plate will be properly centered in the tank body during placement, to avoid eccentric disposal or pinching of the gasket and liability of leakage. To that end the provision of the centering skirt 69 on the shaping ring is particularly important.

Reference to my co-pending applications will show in greater detail other structural features of the liquefier not herein described, and the manner of its use in permitting the building up of pressure in the tank as a result of phase changement from solid carbon dioxide to gas.

Various changes in the shape, size, and arrangement of parts may be made to the form of invention herein shown and described, without departing from the spirit of the invention or the scope of the claims.

I claim:

1. In a high pressure container the combination of a tank body having an opening thereto and an outwardly facing shoulder in the opening, said shoulder being provided with individually continuous ribs projecting outwardly therefrom, a closure plate for fitting upon the container in the opening thereof and when in position having a surface spaced from said shoulder of the tank body to define an annular groove opening radially into the tank, said surface of the cover plate having individually continuous ribs facing in opposed relation with the ribs first mentioned, a distensible gasket in said groove engaging the shoulder and the surface of the cover plate whereon said ribs are disposed and extending at its bight portion across the juncture of the cover plate with said tank body, a rigid member in said gasket between the ribs of said shoulder and cover plate to permit mechanical compression of the gasket against said ribs, and means for venting high pressures into the distensible gasket for forcing the same into sealing relation at the juncture of the cover plate with said tank body.

2. In a high pressure gas container the combination of a shell having an opening thereto and a shoulder therein facing outwardly of said opening, a closure for the opening having means to connect it in the opening to provide a relatively minute metal to metal contact juncture line in the tank between the same and said tank shell, the closure when in position with respect to the shell defining a gasket receiving groove above the shoulder of the shell, a distensible gasket in said groove between said shoulder and the closure having a distensible portion lying across the juncture line of the closure with the shell, a rigid shaping member in the distensible gasket and lying between said shoulder and the facing surface of said closure and clamped by application of the closure upon the shell directly between the cover and said shoulder and compressing the gasket into direct mechanical sealing compression upon said shoulder and the said facing surface of said closure, and means to vent pressures existing in the tank into the distensible gasket for forcing it into sealing compression across the juncture of the closure with the shell.

3. In a closure gasket construction for containers the combination of a closure plate, a distensible gasket ring channel-shaped in formation, a rigid shaping member disposed in the channel of the gasket having means therein opening into the gasket, said member having a portion thereof extending out of the gasket, and clamping means upon the closure plate directly engaging said portion of the shaping member which extends out of the gasket for forcing the shaping member towards the under side of the closure plate and clamping one side of the gasket into compressed sealed connection between the shaping member and under side of the closure plate, the opposite side of said gasket lying in engagement freely against the shaping member in position to be clamped on a seat of the container in which the closure and gasket construction is to be used.

4. In a tank for holding fluids under superatmospheric pressure, a tank body having an opening thereinto, a closure for the opening, a flexible gasket in direct mechanical clamped sealing compression between the closure and tank when the former is in position, means for directing fluid pressures existing within the tank throughout a circumferential zone against the inner side of the gasket to further compress it in sealing contact with the tank body, and means to additionally mechanically compress the gasket in sealing contact with the closure and with the tank at each side of said zone.

5. In a liquefier the combination of a tank body having an opening thereto and a seat in the opening surrounding the same, a closure construction for said opening, a gasket for said seat mechanically clamped by the closure construction against said seat in sealing relation, means to transmit fluid pressures existing in the tank to the inner side of the gasket circumferentially thereabout, and other means to add to the mechanical compression of the gasket upon its seat entirely thereabout between the zone of action of the fluid tank pressure against the inner side of the gasket and the inside of the tank to prevent pressures existing in the tank from leaking therepast.

6. In a tank for holding fluids under superatmospheric pressure, a tank body having an opening thereto and a gasket seat therein, a closure for the opening, a flexible channel-shaped gasket supported in the tank across the juncture of the tank body with the closure, a rigid shaping member in the channel of said gasket overlying said seat, means to clamp the closure to the tank body for direct mechanical clamped compression of the gasket between said closure, tank, and shaping member, means for directing fluid pressures existing within the tank into the gasket throughout a circumferential zone against the inner side of the gasket to further compress it into sealing contact at the juncture of the tank body with the closure, and means to additionally mechanically compress the gasket in sealing contact with the closure and with the tank at each side of said zone.

7. In a tank for holding fluids under superatmospheric pressure, a tank body having an opening thereto and a gasket seat therein, a closure for the opening, a flexible channel-shaped gasket supported in the tank across the juncture of the tank body with the closure, a rigid shaping member in the channel of said gasket overlying said seat, means to clamp the closure to the tank body for direct mechanical clamped compression of the gasket between said closure, tank, and shaping member, means for directing fluid pressures existing within the tank into the gasket throughout a circumferential zone against the inner side of the gasket to further compress it into sealing contact at the juncture of the tank body with the closure, and other means to add to the mechanical compression of the gasket upon the tank body circumferentially about the gasket between the zone of action of the fluid tank pressure against the inner side of the gasket and the inside of the tank in order to prevent fluid pressures existing in the tank from leaking therepast.

8. In a tank for holding fluids under superatmospheric pressure, a tank body having an opening thereto and a gasket seat therein, a closure for the opening, a flexible channel-shaped gasket supported in the tank across the juncture of the tank body with the closure, a rigid shaping member in the channel of said gasket overlying said seat, means to clamp the closure to the tank body for direct mechanical clamped compression of the gasket between said closure, tank, and shaping member, means for directing fluid pressures existing within the tank into the gasket throughout a circumferential zone against the inner side of the gasket to further compress it into sealing contact at the juncture of the tank body with the closure, and other means to add to the mechanical compression of the gasket against the closure entirely about the gasket between the zone of action of the fluid pressure against the inner side of the gasket and the outside of the tank to prevent pressures existing in the tank from leaking therepast.

9. In a high pressure gas tank the combination of a tank body having an opening thereto and a gasket seat therein, a closure for said opening, and a gasket retained between the said tank seat and the closure plate, said gasket being channel-shaped in formation and having a rigid shaping member disposed in said channel and overlying said seat whereby the gasket is mechanically compressed on said seat upon assemblage of the closure upon the tank body, and means in said rigid shaping member for admitting fluid pressures existing within the tank into the gasket for further compressing it on said seat.

10. In a high pressure gas tank the combination of a tank body having an opening thereto and a gasket seat therein, a closure plate for said opening, and a distensible gasket retained between the tank and the closure plate, said gasket being of channel-shaped formation and provided with spaced walls and a bight portion and having a rigid shaping member disposed in the channel thereof, clamping means upon the closure plate directly clamping said shaping member to the plate with one wall of the gasket in mechanically compressed and sealed connection between said shaping member and the closure plate, the other wall of said gasket lying directly in engagement against a surface of the shaping member with the latter overlying said seat whereby said other wall of the gasket is mechanically compressed directly against the seat of the tank body when the closure plate is assembled upon the tank body, and means in said shaping member for admitting pressures existing in the tank to the inside of the gasket for further compressing the same into sealing contact with the tank seat.

11. In a high pressure container the combination of a tank body having an opening thereto and a gasket seat therein, a closure plate for said opening having means to clamp the same upon the tank body without the necessity of rotating the closure plate either to clamp or unclamp the same with respect to said body, a gasket retained between the tank seat and the closure plate, said gasket being channel-shaped in formation and having a rigid shaping member disposed in said channel which overlies said seat whereby the gasket is mechanically compressed on said seat, and means in said shaping member for admitting pressures existing in the tank to enter the channel for compressing the gasket into sealing relation upon said seat.

12. In a high pressure gas tank the combination of a tank body having an opening thereto and a gasket seat therein a closure plate for the opening, a flexible channel-shaped gasket supported in the tank across the juncture of the tank body with the closure, a rigid shaping member in the channel of said gasket and overlying said seat, means to clamp the closure to the tank body for direct mechanical clamped compression of one side of the gasket between the closure plate and shaping member and with the other side of the gasket between the shaping member and the tank seat, and means in said shaping member for admitting fluid pressures existing in the tank to enter the gasket about a circumferential zone for compressing it into sealing contact with said gasket seat.

13. In a high pressure gas tank the combination of a tank body having an opening thereto and a gasket seat therein, a closure for said opening, and a gasket retained between the said tank seat and the closure plate, said gasket being channel-shaped in formation and having a rigid shaping member disposed in said channel and overlying said seat whereby the gasket is mechanically compressed on said seat upon assemblage of the closure upon the tank body, means in said rigid shaping member for admitting fluid pressures existing within the tank into the gasket for further compressing it on said seat, said closure being adapted to be lowered without rotation into resting position in said tank body in order to mechanically compress the gasket, and means to clamp said closure and hold it in gasket compressing relation without the necessity of rotating said plate.

JENS CLAUSEN.